C. J. TROPPMAN.
INSTRUMENT FOR MEASURING LENSES.
APPLICATION FILED NOV. 25, 1912.
1,083,309.
Patented Jan. 6, 1914.
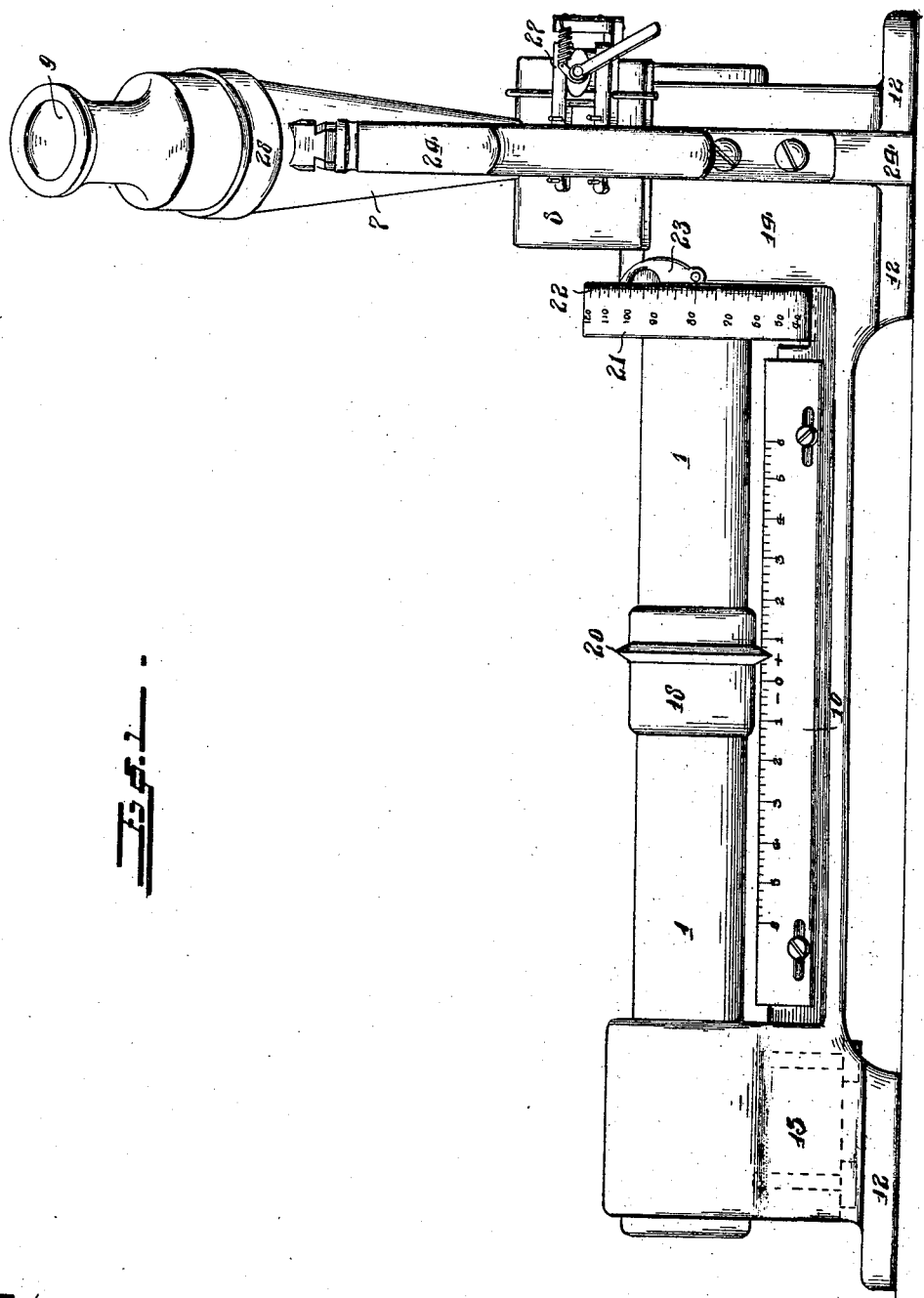

C. J. TROPPMAN.
INSTRUMENT FOR MEASURING LENSES.
APPLICATION FILED NOV. 25, 1912.
1,083,309.
Patented Jan. 6, 1914.
3 SHEETS—SHEET 2.
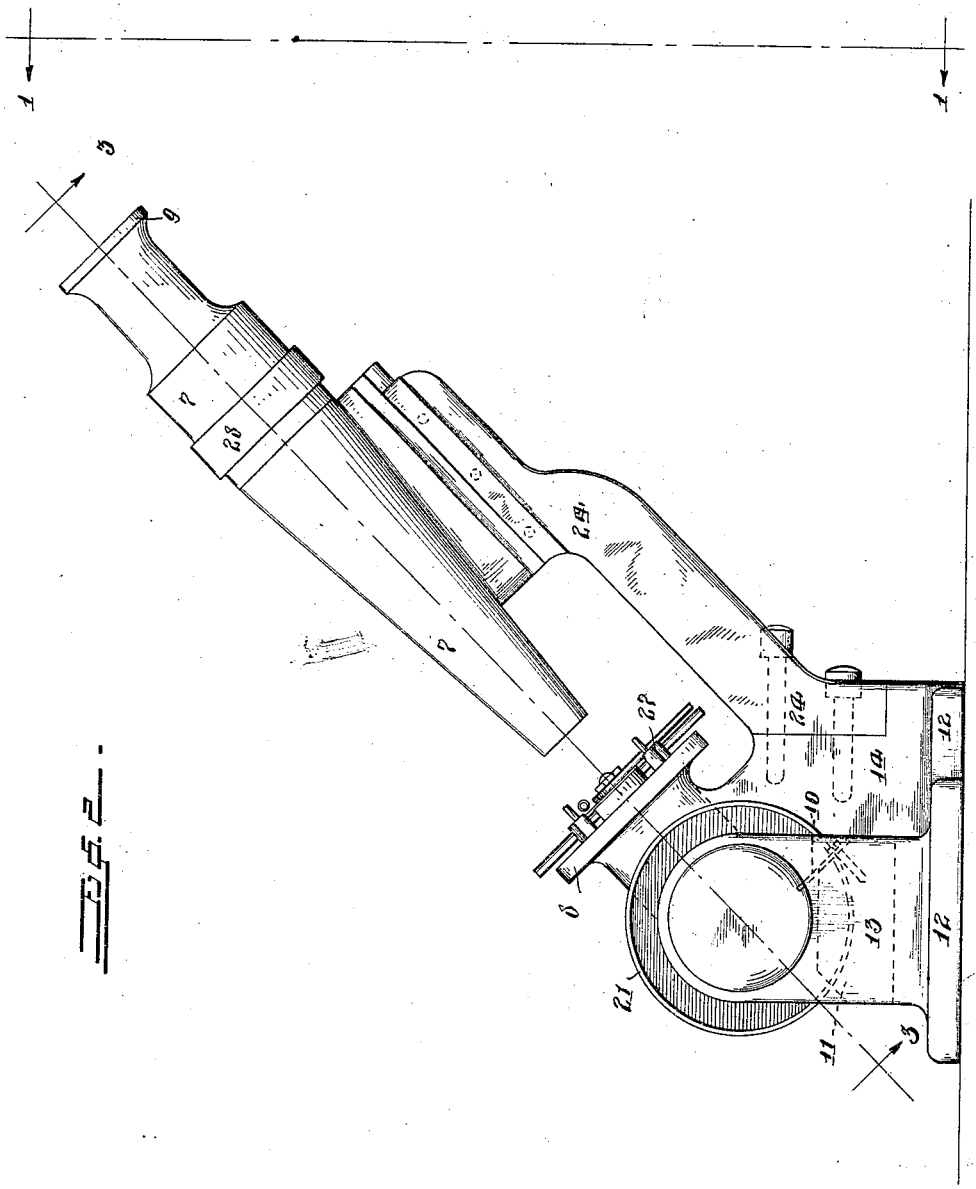
WITNESSES:
Wm. Harold Eickelman.
M. A. Milord
INVENTOR:
CHAS. J. TROPPMAN.
By Benj. T. Woodhouse
ATTY.

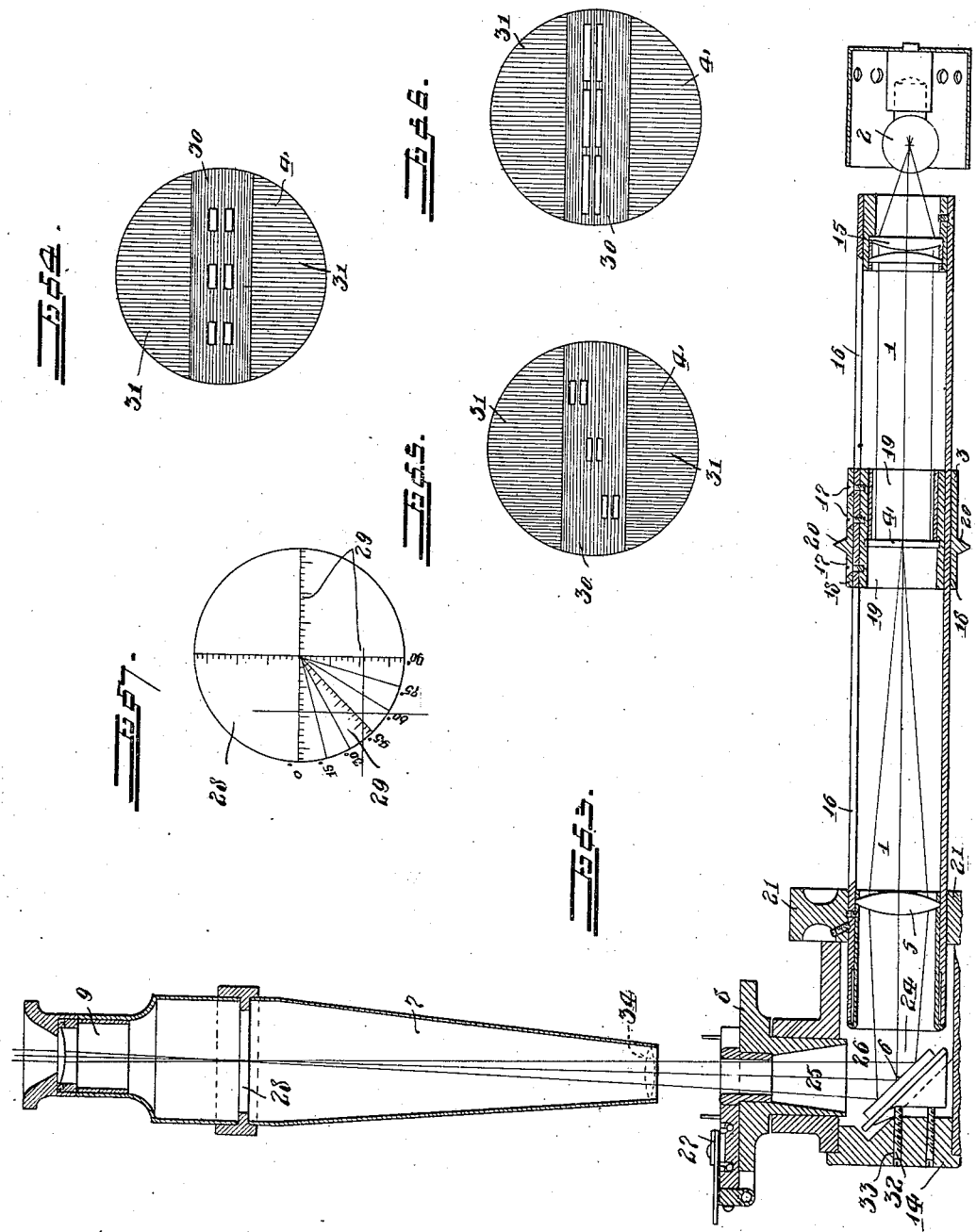

UNITED STATES PATENT OFFICE.

CHARLES J. TROPPMAN, OF CHICAGO, ILLINOIS, ASSIGNOR TO F. A. HARDY & COMPANY, OF CHICAGO, ILLINOIS, A CORPORATION OF ILLINOIS.

INSTRUMENT FOR MEASURING LENSES.

1,083,309.  Specification of Letters Patent.  Patented Jan. 6, 1914.

Application filed November 25, 1912. Serial No. 733,252.

*To all whom it may concern:*

Be it known that I, CHARLES J. TROPPMAN, a citizen of the United States, and a resident of Chicago, in the county of Cook and State of Illinois, have invented a certain new and useful Instrument for Measuring Lenses, of which the following is a specification.

My present invention relates to the provision of an instrument for ascertaining the focalizing power of a lens or degree of refraction of a prism and the axis of greatest or least refraction in a cylinder, and to be able to ascertain that data either singly or in combination.

I effectuate the above objects by means of the structure illustrated in the accompanying drawings, in which:—

Figure 1 is a longitudinal elevation of my new lens testing instrument looking from the operator's side thereof; Fig. 2 is an end elevation of the instrument looking from the end in which the light is located; Fig. 3 is a central section on line 3—3 of Fig. 2; Fig. 4 is a view of a preferred design of target; Figs. 5 and 6 are views showing the target respectively when the cylinder being tested is off axis and is on the axis of greatest magnification; Fig. 7 is a design of screen to be inserted in the eye tube for ascertaining the position of the axis and the optical centering of the lens.

Similar reference characters refer to similar parts throughout the several views.

The instrument comprises essentially a horizontal tube, 1, at one end of which is located a source of illumination, preferably an electric light bulb 2. Longitudinally movable in the tube 1, is a target carriage, 3, having a target, 4, therein which is disposed transversely of the tube, 1. At the end of the tube, 1, opposite the source of illumination is mounted a projecting lens, 5. Back of the projecting lens, 5, is a mirror, 6, inclined so as to reflect the projected image of the target up an eye tube, 7, which is located at right angles to the tube, 1, and so mounted as to provide a space between the mounting of the mirror, 6, and the lower end of the eye tube in which space, and centering with the axis of the reflected light, is a table or stage, 8, for receiving the lens to be tested.

A magnifying eye piece, 9, is mounted in the observer's end of the eye tube, 7, and there are various other details to be hereafter described for facilitating the necessary or desirable manipulating but the arrangement of elements as above enumerated will illustrate the principle of operation of the instrument which is as follows:—It is known that if the target, 4, be placed beyond the plane of the principal focus of the lens, 5, an image of the target will be projected at a definite plane upon the other side of the lens, and that the relation between the target, the lens and the image will be in accordance with the principle of conjugate foci. A scale, 10, (shown in Fig. 1) is provided with a zero point to indicate when the target is in proper position to bring the image in the plane to be observed through the eye piece, 9. The lens to be tested is interposed at the plane of the principal or equivalent focus of the projecting lens which makes it possible to employ a scale of equal intervals, as movements of the target with such an arrangement of lenses through equal distances will result in equal modifications of the refracting power of the lens, 5, or of the lens, 5, and any other lens which may be interposed in the axis of the projected light at 8. The location of the table 8 is such that the lens to be tested is disposed in the plane of the principal focus of the projecting lens 5.

With the above described optical arrangement the equivalent power of the projecting lens and the lens to be tested remaining constant, the magnification remains constant also, which results in securing an image of constant size for inspection thereby throwing much less work upon the operator's eye in making the necessary examination. It will, therefore, be seen that when a lens is placed upon the table, 8, the extent of movement of the target, 4, upon the scale, 10, will afford a basis for the calculation of, or if the scale, 10, has been suitably marked with respect to the power of the lens 5, will directly indicate, the power of the lens upon the table 8.

The instrument comprises a base, 11, which stands in front of the operator upon feet, 12, at either end. Upon each end of the base are provided brackets, 13 and 14. Journaled between the brackets, 13 and 14, so as to be rotatable, is the tube, 1, and in the bracket, 13, alining with the axis of the tube, 1, is mounted an electric light bulb, 2. In the end of the tube, 1, adjacent the electric light bulb is a condenser, 15, to parallel the rays of light so as to get a better illumination of the target, 4.

The tube, 1, is provided with a longitudinal slot, 16, through which extend the screws, 17, between an outer collar, 18, surrounding the tube, 1, and an inner tube, 19, in which a target is mounted. About the collar, 18, is an angular ridge, 20, which forms a pointer for the scale, 10, mounted below the tube, 1, upon the base, 11.

Closely adjacent the bracket, 14, upon the tube, 1, is secured a collar, 21, upon the periphery of which is provided a scale, 22, which with a pointer, 23, secured to the bracket, 14, indicates the meridian of the target, 4, as the tube, 1, is rotated.

As clearly shown in Fig. 2, the bracket, 14, is provided with an arm, 24, to which is secured the eye tube, 7. The bracket, 14, is bored at 25 in a line with the axis of the eye tube to the chamber, 26, in the bracket, 14, in which the tube, 1, is journaled, and in the chamber 26 is mounted a mirror 6, at an angle so as to reflect the light coming from the lens, 5, up the eye tube. Upon the bracket, 14, and centering with the bore, 25, is mounted a suitable form of lens centering stage or table, 27, a good and well known form of which is illustrated in Fig. 1. In the proper plane to be viewed through the eye piece, 9, in the eye tube, 7, is mounted a translucent screen 28, upon which the image of the target may be focused, and which may be conveniently provided with the ordinal scales, 29, as shown in Fig. 7, for ascertaining and measuring the location of the meridians and the centering of the focalization or optical center.

A preferred design of target, as shown in Fig. 4, comprises the series of rectangular blocks of ruled lines, 30, extending across the target on either side of which are areas of parallel rulings, 31, disposed at right angles to the ruling of the blocks.

When the cylinder lens to be tested is disposed upon the centering stage or table, 27, and the operator rotates the tube, 1, until the axis of the blocks of lines, 30, coincides with the meridian of no refraction of the cylinder lens, the rulings of the respective blocks will aline. The meridian of this position will be indicated upon the scale, 22, upon the periphery of the cylinder, 21. In such a position, when the lines of the blocks 30 are in critical focus the pointer ring, 20, should be at the zero mark upon the scale, 10, and the image of the parallel ruling of the areas, 31, would be blurred.

The power of refraction of the cylinder could now be ascertained, if desired, by moving the target carriage with the target, 4, toward the lens 5 if the cylinder were a plus cylinder, or away from the lens 5 if the cylinder were a minus cylinder, until the parallel ruling of the areas, 31, were in focus, and the extent of movement as noted on the scale, 10, would give the power of the cylinder.

The moment the tube, 1, was rotated so as to destroy the coincidence between the meridian of the blocks of ruling, 30, and the axis of no refraction of the cylinder, the ruling of the respective blocks, 30, would not aline, and the image of the target would appear more or less as shown in Fig. 5. When, however, the meridian of the blocks of rulings 30 of the target were brought into coincidence with the meridian of greatest refraction of the cylinder, the lines of the blocks 30 would be magnified longitudinally or elongated with a plus cylinder and would appear more or less as shown in Fig. 6. It will be appreciated that the extent or power of focalization of the cylinder may also be ascertained in the same manner as above described in this position.

The insertion of the screen 28 in the eye tube 7 would occasion the image of the target to be produced thereon in coincidence with the ordinal chart or scale, 29, when the characteristic of the image as modified by the lens to be tested could be visually inspected and measured.

The location of the tube, 1, at right angles to the eye tube, 7, gives the operator a convenient arrangement for inspection and manipulation, and the provision of the eye piece, 7, secures a magnification which increases the accuracy of the tests. The mirror 6 is mounted so as to permit of adjustment upon screws, 32, working in interiorly threaded holes, 33, in the bracket casing, 14.

It will also be appreciated that the provision of an instrument wherein the power of magnification may be easily ascertained from the inspection of a uniform scale is a great advantage.

I have indicated in Fig. 3, in dotted lines, a lens, 34, which may be located in the lower end of the eye tube, 7. When a lens of known value is so disposed, its value must be added to, or subtracted from, according to whether it is either a minus or plus lens, the scale reading. In this manner the capacity of the instrument may be increased to accommodate it to lenses of extreme curvature.

Having described my invention, what I claim as new and desire to secure by Letters Patent, is:—

1. An instrument for testing lenses comprising a projecting lens, a target disposed in the optical axis of said lens, means for moving said target longitudinally of said optical axis, a scale for measuring the longitudinal movement of said target, means for holding a lens to be tested in the plane of the principal focus of the projecting lens and in the optical axis of the path of the light, and means for viewing the image of said target.

2. An instrument for testing lenses comprising a projecting lens, a target disposed in the optical axis of said lens, means for moving said target longitudinally of said optical axis, a scale for measuring the longitudinal movement of said target in terms of the extent of the modification of focalization caused thereby, means for holding a lens to be tested in the plane of the principal focus of the projecting lens and in the optical axis of the path of the light, and means for viewing the image of said target.

3. An instrument for testing lenses comprising a projecting lens, a target disposed in the optical axis of said lens, means for rotating said target, means for moving said target longitudinally of said optical axis, a scale for measuring the longitudinal movement of said target in terms of the extent of the modification of focalization caused thereby, means for holding a lens to be tested in the plane of the principal focus of the projecting lens and in the optical axis of the path of the light, and means for viewing the image of said target.

4. An instrument for testing lenses comprising a projecting lens, a target disposed in the optical axis of said lens, means for rotating said target, a scale for determining the position to which said target may be rotated, means for moving said target longitudinally of said optical axis, a scale for measuring the longitudinal movement of said target in terms of the extent of the modification of focalization caused thereby, means for holding a lens to be tested in the plane of the principal focus of the projecting lens and in the optical axis of the path of the light, and means for viewing the image of said target.

5. An instrument for testing lenses comprising a projecting lens, a target disposed in the optical axis of said lens, means for rotating said target, a scale for determining the position to which said target may be rotated, means for moving said target longitudinally of said optical axis, a scale for measuring the longitudinal movement of said target in terms of the extent of the modification of focalization caused thereby, a reflector interposed in and at an angle to the path of the projected light, means for holding a lens to be tested in the plane of the principal focus of the projecting lens and in the optical axis of the path of the light, and means for viewing the image of said target.

6. An instrument for testing lenses comprising a projecting lens, a target disposed in the optical axis of said lens, means for rotating said target, a scale for determining the position to which said target may be rotated, means for moving said target longitudinally of said optical axis, a scale for measuring the longitudinal movement of said target in terms of the extent of the modification of focalization caused thereby, a reflector interposed in and at an angle to the path of the projected light, means for holding a lens to be tested in the plane of the principal focus of the projecting lens and in the optical axis of the path of the light, a removable screen disposed in a plane to receive the image of said target, and means for viewing the image of said target.

7. An instrument for testing lenses comprising a projecting lens, a target disposed in the optical axis of said lens, means for rotating said target, a scale for determining the position to which said target may be rotated, means for moving said target longitudinally of said optical axis, a scale for measuring the longitudinal movement of said target in terms of the extent of the modification of focalization caused thereby, a reflector interposed in and at an angle to the path of the projected light, means for holding a lens to be tested in the plane of the principal focus of the projecting lens and in the optical axis of the path of the light, a screen disposed in a plane to receive the image of said target, and means for viewing the image of said target.

8. An instrument for testing lenses comprising a projecting lens, a target disposed in the optical axis of said lens, means for rotating said target, a scale for determining the position to which said target may be rotated, means for moving said target longitudinally of said optical axis, a scale for measuring the longitudinal movement of said target in terms of the extent of the modification of focalization caused thereby, a reflector interposed in and at an angle to the path of the projected light, means for holding a lens to be tested in the plane of the principal focus of the projecting lens and in the optical axis of the path of the light, a removable screen disposed in a plane to receive the image of said target, scales upon said screen for measuring the location of portions of the image of said target, and means for viewing the image of said target.

9. An instrument for testing lenses comprising a lens element, a target movable longitudinally in the optical axis of said lens element, a scale for measuring the longitudinal movement of said target, means for holding a lens to be tested in the plane of the principal focus and in the optical axis of said lens element, and means for viewing the image of said target.

In testimony whereof I affix my signature in the presence of two witnesses.

CHARLES J. TROPPMAN.

Witnesses:
E. O. TROEGER,
BENJ. T. ROODHOUSE.